July 16, 1968 J. B. GEROSA ET AL 3,393,278

TELEPHONE HOOKLOCK ASSEMBLY

Filed Sept. 13, 1965

INVENTOR
JOHN B. GEROSA
JOSEPH M. HARTZ
FRANK J. PETKEWICZ
BY C. G. Gullbrandsen
ATTY.

United States Patent Office 3,393,278
Patented July 16, 1968

3,393,278
TELEPHONE HOOKLOCK ASSEMBLY
John B. Gerosa, Glenview, Joseph M. Hartz, Elmhurst, and Frank J. Petkewicz, Chicago, Ill., assignors to Automatic Electric Laboratories, Inc., Northlake, Ill., a corporation of Delaware
Filed Sept. 13, 1965, Ser. No. 486,688
7 Claims. (Cl. 179—100)

This invention relates to telephone substation apparatus and in particular to hookswitch locking means for a telephone substation.

When a telephone service man installs a new telephone subset or repairs an existing one, he must invariably remove the telephone housing from its base and the handset from the switch hook. In doing so, the switch hook moves into an off-hook or talking position, certain equipment at the central office is taken out of service and incoming calls cannot be received.

The prior art shows apparatus devised to allow the switch hook to be held in on-hook position on a telephone subset which has had its housing and handset removed. For instance, Patent 2,810,792, R. L. Sargisson et al., Telephone Switch Hook Assembly, discloses a switch hook having the usual talking and non-talking positions controlled by a lever which is normally in the talking position due to a helical spring, tensioned to keep the lever that way. However, the above mentioned switch hook may be moved into a third position upon removal of the housing. This is done manually by moving the switch hook lever by means of a toggle action beyond a dead-center point wherein the helical spring can act on the lever to maintain it in on-hook position. Upon replacing the housing the switch hook lever is automatically restored to a point where the spring can once again act to return the switch hook to normal use.

The present invention improves on the aforementioned patent. According to the present invention, the subset is held in an on-hook or nontalking position when the handset and housing are removed and the switch hook automaticaly released for normal use on replacing the housing; and this is accomplished in an extremely simple manner without requiring a special hook switch mechanism and particularly not requiring the toggle action of a spring. The embodiment shown here is designed specificaly for use with the wall mounted subset shown in the copending application of J. L. Schoemann, Telephone Apparatus, Ser. No. 349,412, filed Mar. 4, 1964 now patent No. 3,303,291, issued Feb. 7, 1967, but is not limited to a telephone subset of this design.

Accordingly it is an object of this invention to provide a means by which to retain the switch hook mechanism of a telephone subset in an on-hook position while the housing of the subset is removed.

Another object of the invention is a switch hook locking mechanism which is self-contained, can be inexpensively manufactured, and may be used in conjunction with switch hooks of conventional design.

Still another object of the invention is to provide a wall mounted telephone which will allow a repairman to complete his repairs or installation in a minimum time and with minimum effort.

In the preferred embodiment of the invention shown herein, the above objects are attained by a switch hook locking bracket which, after the housing of a subset has been removed, engages the switch hook upon being moved to an on-hook position to retain the switch hook in this position, and which is automatically released under the control of a cam portion on the housing upon replacement of the latter.

Another feature of this embodiment is a snap-on means which is preferably incorporated in the switch hook locking bracket to secure the housing of the telephone subset to its base.

Another feature of this embodiment is a provision which allows a repairman to hang the housing and handset of a wall mounted telephone subset in a convenient out of the way location when the housing is removed from its base. Preferably the aforementioned snap-on means is used for this purpose.

These and other objects and features of the invention will become more apparent from a further perusal of the following description taken in conjunction with the accompanying drawings of which:

Figure 1:
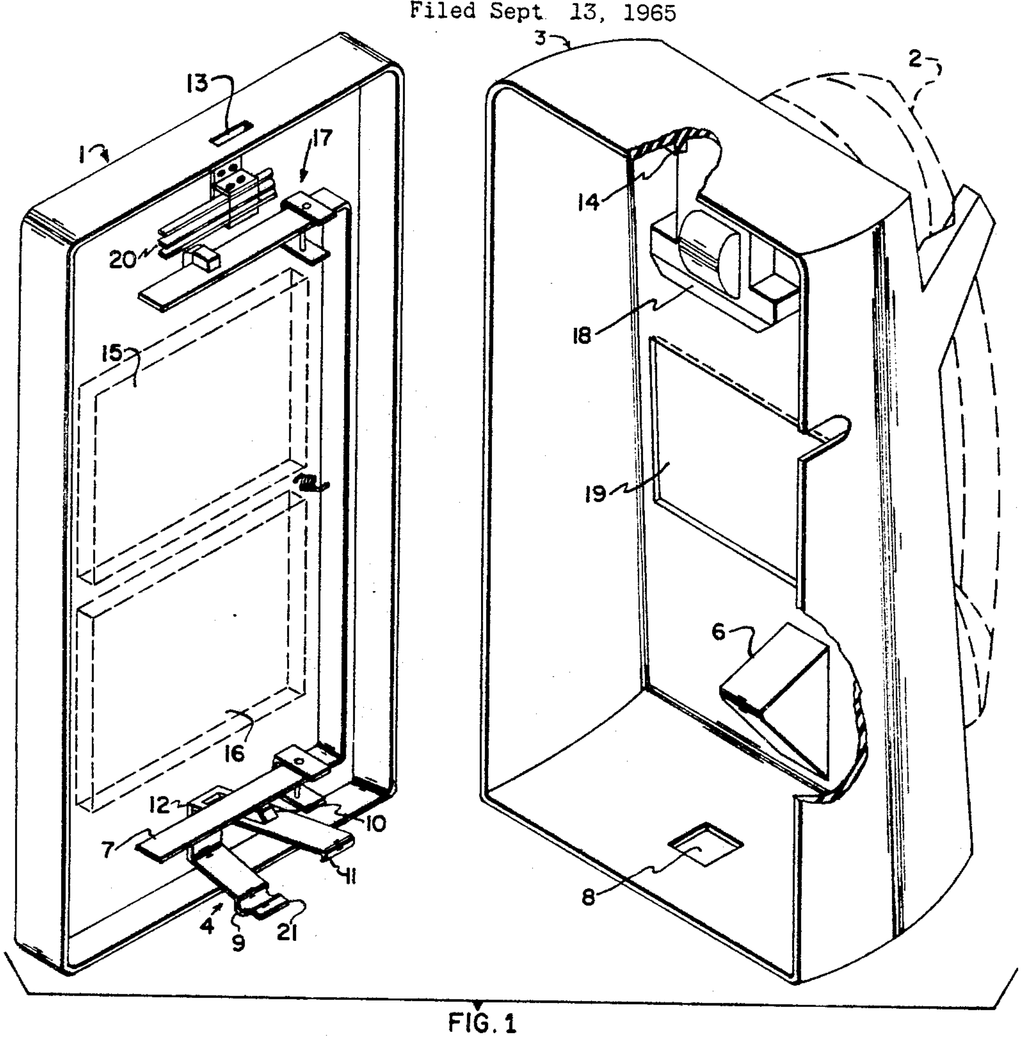
FIG. 1 is an exploded view of a telephone subset having a switch hook locking means located therein according to the invention.

FIG. 1 illustrates a telephone subset according to the invention. The left half of FIG. 1 shows base 1 having therein hookswitch assembly 17 including hookswitch pileup 20, and in phantom, transmission network 15 and ringer assembly 16. Shown engaging leg 7 of hookswitch assembly 17 is hookswitch locking device 4 which is secured to base 1 at its base portion 12 by means of screw 22 (shown in FIG. 2) which is also used as one of the screws to secure base 1 to a support surface.

The right half of FIG. 1 shows the inside of housing 3 with handset 2 in place thereon. Shown also are hookswitch depressor 18, dial aperture 19, cam portion 6 and aperture 8.

Figure 3:
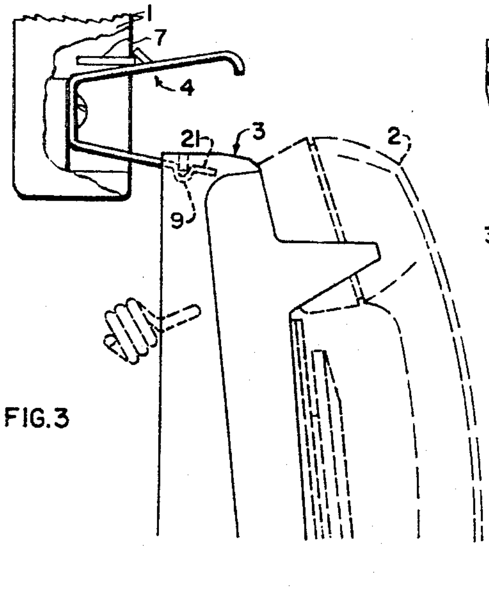
FIG. 3 shows the position in which the housing and handset of the telephone subset according to the invention are placed when removed from the base of the subset for repairs or other purposes.

FIG. 3 shows housing 3 with handset 2 in place thereon, hanging from leg portion 9 of hookswitch locking device 4.

A more detailed description of the operation and use of the hookswitch locking device according to the invention will now be given.

Looking at FIG. 1, when a repairman removes housing 3 of the telephone subset shown, the hookswitch assembly 17 moves to an off-hook position. To prevent this from occurring so that central office equipment is not taken out of service and so incoming calls may be received while the repairs are being made, switch hook locking device 4 is used.

The repairman merely has to move leg 7 of switch hook assembly 17 to an on-hook position. In doing this, leg 11 of switch hook locking devices 4 engages switch hook leg 7 by means of protruding portion 10, thus keeping the switch hook in an on-hook position.

Referring to FIG. 3, the repairman may now hang housing 3 with handset 2 in place thereon, from portion 9 of leg 21 of switch hook locking device 4. This prevents possible damage to the housing or handset which may occur due to setting the housing on the floor or a table while the repairman is performing his work.

If an incoming call should be received, while the repairs are being made, leg 11 of the device 4 is merely depressed and the switch hook assembly is free to move to an off-hook position. When the call is completed, leg 7 of switch hook 17 is moved back to an on-hook position to relock the switch hook.

After the repairs are completed, the repairman simply has to replace housing 3 on base 1 and the subset is put back into normal operation. No adjustments have to be made before the housing is replaced. Looking at this more closely, the repairman must first locate piece 14 on housing 3 in aperture 13 of base 1, then he must move the lower portion of housing 3 toward base 1 until portion 9 of leg 21 of switch hook locking device 4 moves into aperture 8, in housing 3 (shown in position in FIG. 2). As the housing was being placed on base 1, cam portion 6, located in housing 3 opposite leg 11 of device 4, was engaging leg 11 of device 4 and depressing leg 11 so that protruding portion 10 became disengaged from leg 7 of switch hook assembly 17.

Figure 2:
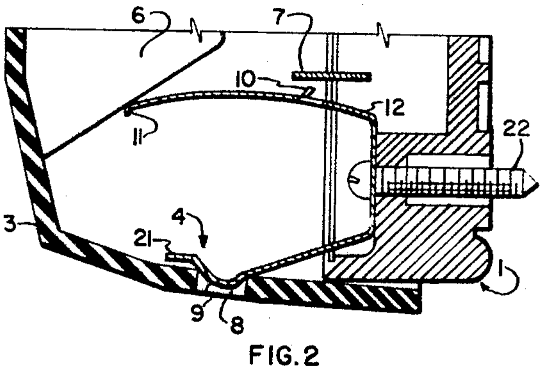
FIG. 2 is sectioned side view of a portion of the telephone subset of FIG. 1 with its housing in place on its base.

As can be seen from FIG. 2, when the housing is in its normal position on the base, cam portion 6 secures leg 11 of device 4 in a position such that leg 7 of switch hook assembly 17 will be able to move freely. Leg 21 is also tensioned so that it locks portion 9 in aperture 8 and secures housing 3 on base 1 without the use of screws.

Now the subset is ready for use.

Hookswitch depressor 18 (shown in FIG. 1) will operate hookswitch assembly 17 in the normal manner. The switch hook locking device is held out of contact with the hookswitch assembly and will only be put into use if the housing is again removed.

It will be obvious to those skilled in the art that changes and modifications may be made without departing from this invention in its broadest aspects and, therefore, the aim in the appended claims is to cover all such changes and modifications as in the true spirit and scope of this invention.

What is claimed is:

1. A telephone subset, comprising:
- a base,
- a removable housing supported on said base,
- a handset,
- a switch hook assembly having an off-hook and on-hook position and controlled by said handset with said housing in position on said base,
- a switch hook locking device mounted on said base,
- and means on said housing permitting said device to move so that it may be locked into engagement with said switch hook when said housing is removed from said base, thereby to keep said switch hook in on-hook condition, said means re-engaging said device and automatically releasing said switch hook into off-hook condition when said housing is replaced on said base.

2. A telephone subset as claimed in claim 1, wherein said switch hook locking device includes means for securing said housing on said base when said housing is replaced on said base.

3. A telephone subset as claimed in claim 1 wherein said switch hook locking device comprises a leaf spring mounted at one end to said base and has at its other end a protruding portion for engaging said switch hook upon moving said switch hook into an on-hook position when said housing is removed from said base.

4. A telephone subset as claimed in claim 1 wherein said means on said housing comprises a cam portion on the inner surface of said housing opposite said locking device which re-engages said device and automatically releases said switch hook into off-hook condition when said housing is replaced on said base.

5. A wall mounted telephone subset, comprising:
- a base,
- a removable housing supported on said base,
- a handset,
- a switch hook assembly having an off-hook and on-hook position and controlled by said handset with said housing in position on said base,
- a switch hook locking device comprising a substantially U-shaped spring member having a base portion and first and second leg portions, said spring member being mounted on said base at said base portion,
- and a cam portion on the inner surface of said housing opposite said first leg portion permitting said leg portion to move so that it may be locked into engagement with said switch hook when said housing is removed from said base, thereby to keep said switch hook in on-hook condition, said cam portion re-engaging said first leg portion and automatically releasing said switch hook into off-hook condition when said housing is replaced on said base.

6. A wall mounted telephone subset as claimed in claim 5 wherein said housing and said handset in place on said housing, may be placed in a hanging position from said second leg portion after said housing has been removed from said base.

7. A wall mounted telephone subset as claimed in claim 5 wherein said housing has an aperture therethrough for receiving a portion of said second leg portion upon replacing said housing on said base, whereby said housing is held securely to said base.

No references cited.

KATHLEEN H. CLAFFY, *Primary Examiner.*

LAURENCE WRIGHT, *Assistant Examiner.*